US008699468B2

(12) United States Patent
Senoo

(10) Patent No.: US 8,699,468 B2
(45) Date of Patent: Apr. 15, 2014

(54) FREQUENCY DEVIATION ESTIMATING METHOD AND BASE STATION APPARATUS

(75) Inventor: Hiroaki Senoo, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 85 days.

(21) Appl. No.: 13/484,443

(22) Filed: May 31, 2012

(65) Prior Publication Data

US 2012/0236809 A1    Sep. 20, 2012

Related U.S. Application Data

(63) Continuation of application No. PCT/JP2009/070177, filed on Dec. 1, 2009.

(51) Int. Cl.
*H04W 4/00* (2009.01)

(52) U.S. Cl.
USPC .......................................... 370/332; 455/296

(58) Field of Classification Search
USPC ............... 370/328, 329, 332, 344; 455/67.11, 455/296, 129, 501
See application file for complete search history.

(56) References Cited

U.S. PATENT DOCUMENTS

| | | | | |
|---|---|---|---|---|
| 2008/0089395 | A1* | 4/2008 | Cairns | 375/148 |
| 2008/0188192 | A1* | 8/2008 | Chae et al. | 455/129 |
| 2010/0130135 | A1* | 5/2010 | Wang et al. | 455/67.11 |
| 2011/0059713 | A1* | 3/2011 | Okello et al. | 455/296 |
| 2011/0092231 | A1* | 4/2011 | Yoo et al. | 455/501 |
| 2011/0134902 | A1* | 6/2011 | Ko et al. | 370/344 |
| 2013/0223380 | A1* | 8/2013 | Kim et al. | 370/329 |

FOREIGN PATENT DOCUMENTS

| | | |
|---|---|---|
| JP | 2009-124301 | 6/2009 |
| JP | 2009-171266 | 7/2009 |
| WO | 2008/105420 | 9/2008 |

OTHER PUBLICATIONS

International Search Report dated Dec. 28, 2009, from corresponding International Application No. PCT/JP2009/070177.
Texax Instruments, "UL Synchronization Management and Maintenance in E-UTRA", 3GPP TSG RAN WG1 #49 R1-072198, May 7-11, 2007.
NTT DoCoMo, et al. "Closed Loop Antenna Switching in E-Utra Uplink" 3GPP TSG RAN WG1 #48, R1-070860, Feb. 12-16, 2007.

* cited by examiner

*Primary Examiner* — Hassan Phillips
*Assistant Examiner* — Ajay Cattungal
(74) *Attorney, Agent, or Firm* — Katten Muchin Rosenman LLP

(57) ABSTRACT

A frequency deviation is to be estimated in a wireless communication system in which a control data transmission channel and a user data transmission channel are allocated to different frequency bands. An estimation result using a reference signal for modulation in the user data control channel and an estimation result using a reference signal for estimating channel quality may be combined, according to an estimation result using a reference signal for modulation in the control data transmission channel, in order to modify the allocation period of the reference signal for estimating channel quality depending on the estimation result.

14 Claims, 17 Drawing Sheets

FIG.3

| ITEM | PHYSICAL CHANNEL | NO. OF USABLE SUBCARRIERS | FREQUENCY DEVIATION ESTIMATABLE RANGE [Hz] |
|---|---|---|---|
| 1 | PUCCH FORMAT 2 | 12 & FIXED | 1750 |
| 2 | PUSCH | VARIABLE | 1000 |
| 3 | S-RS (TRANSMISSION PERIOD OF 2 SUBFRAMES) | VARIABLE | 250 |
| 4 | S-RS (TRANSMISSION PERIOD OF 5 SUBFRAMES) | VARIABLE | 100 |
| 5 | S-RS (TRANSMISSION PERIOD OF 10 SUBFRAMES) | VARIABLE | 50 |

FIG.4

| ITEM | PHYSICAL CHANNEL | NO. OF USABLE SUBCARRIERS | FREQUENCY DEVIATION ESTIMATABLE RANGE [Hz] |
|---|---|---|---|
| 1 | PUCCH FORMAT 2 | 12 & FIXED | 1000 |
| 2 | PUSCH | VARIABLE | 1000 |
| 3 | S-RS (TRANSMISSION PERIOD OF 2 SUBFRAMES) | VARIABLE | 250 |
| 4 | S-RS (TRANSMISSION PERIOD OF 5 SUBFRAMES) | VARIABLE | 100 |
| 5 | S-RS (TRANSMISSION PERIOD OF 10 SUBFRAMES) | VARIABLE | 50 |

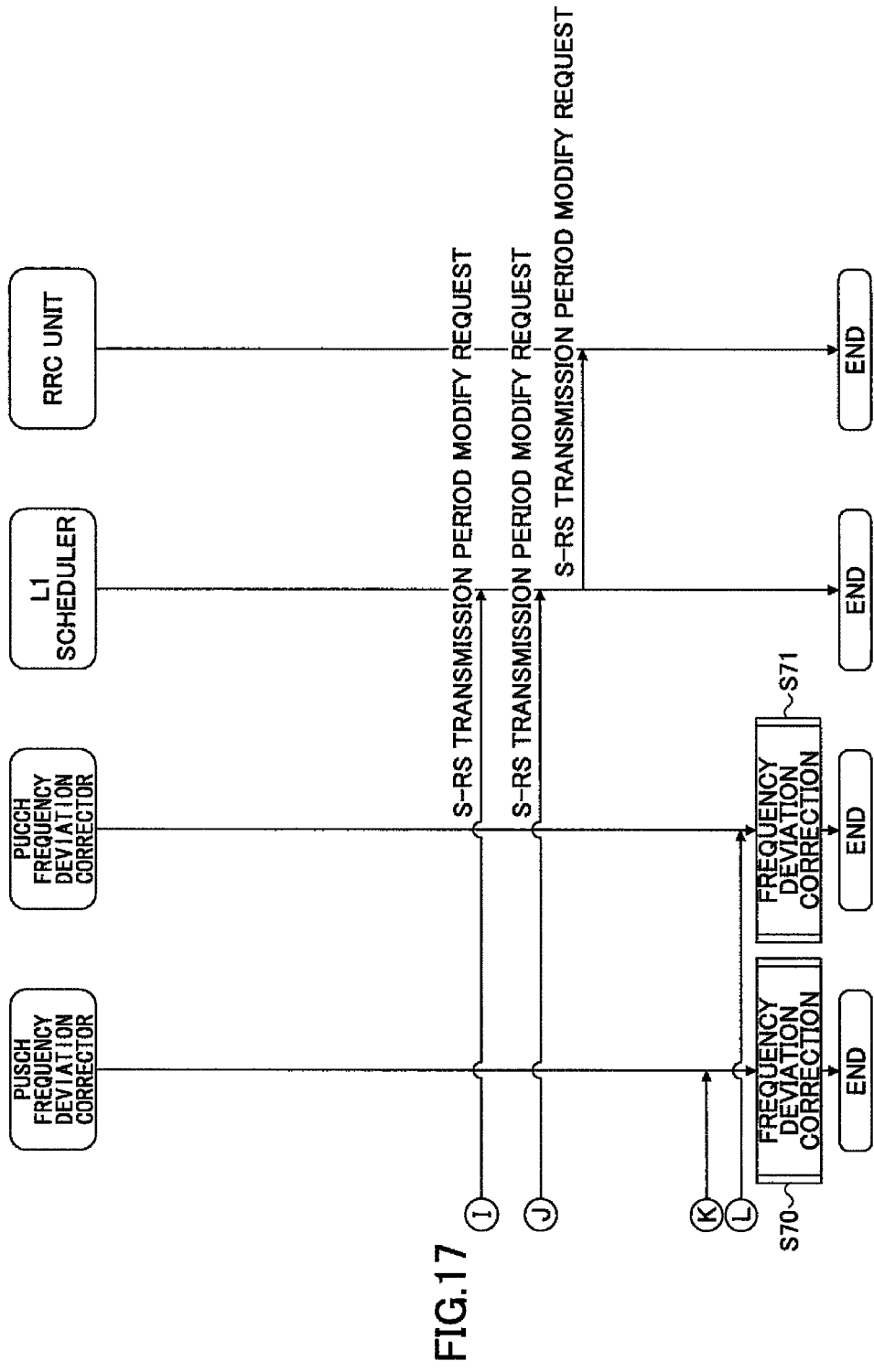

FREQUENCY DEVIATION ESTIMATING METHOD AND BASE STATION APPARATUS

CROSS-REFERENCE TO RELATED APPLICATION

This application is a continuation application of International Application No. PCT/JP2009/070177 filed on Dec. 1, 2009 and designated the U.S., the entire contents of which are incorporated herein by reference.

FIELD

The embodiments discussed herein are related to a frequency deviation estimating method and a base station apparatus.

BACKGROUND

In wireless communication, a frequency deviation (or offset) occurs between a transmitting apparatus and a receiving apparatus, due to an error (or offset) between clock frequencies used in the transmitting apparatus and the receiving apparatus. The receiving apparatus may estimate the frequency deviation and eliminate effects of the frequency deviation, in order to reduce a bit error rate.

In an OFDM (Orthogonal Frequency Division Multiplexing) reception signal in which a plurality of pilot signals are arranged distributively, the frequency deviation may be estimated by computing a phase rotation from a channel frequency response of each pilot signal and a correlation value of the channel frequency responses among the pilot signals, as proposed in a Japanese Laid-Open Patent Publication No. 2009-124301, for example.

Recently, wireless communication systems such as the LTE (Long Term Evolution) system are being developed. The LTE may realize a highly efficient and highly reliable data transmission, by using the OFDMA (Orthogonal Frequency Division Multiple Access) for the downlink, and using the SC-FDMA (Single Carrier Frequency Division Multiple Access) for the uplink.

In the uplink of the LTE, a control data transmission channel and a user data transmission channel are allocated to different frequency bands. A reference signal for demodulation (or reference signal to be used for demodulation) is included in the control data transmission channel, and a reference signal for demodulation and a reference signal for estimating channel quality are included in the user data transmission channel. Time intervals of the reference signal for demodulation in the user data transmission channel is set to be the same as, or may be set to be longer than time intervals of the reference signal for demodulation in the control data transmission channel. In addition, time intervals of the reference signal for estimating channel quality in the user data transmission channel is set to be longer than the time intervals of the reference signal for demodulation in the user data transmission channel.

Hence, it may be desirable to accurately estimate the frequency deviation also in the wireless communication system in which a plurality of kinds of reference signals having different time intervals are arranged in the control data transmission channel and the user data transmission channel.

SUMMARY

Accordingly, it is an object in one aspect of the embodiment to provide a frequency deviation estimating method and a base station apparatus, which may accurately estimate the frequency deviation.

According to one aspect of the present invention, a base station apparatus for a wireless communication system in which a control data transmission channel and a user data transmission channel are allocated to different frequency bands, may include a first estimator configured to estimate a frequency deviation using a first reference signal for demodulation, included at predetermined time intervals, in the control data transmission channel that is received; a second estimator configured to estimate a frequency deviation using a second reference signal for demodulation, included at time intervals longer than those of the first reference signal, in the user data transmission channel that is received; a third estimator configured to estimate a frequency deviation using a third reference signal for estimating channel quality, included at time intervals longer than those of each of the first and second reference signals, in the user data transmission channel that is received; and a determinator configured to obtain a frequency deviation estimation result by obtaining the frequency deviation estimation result from a first value of the frequency deviation estimated by the first estimator when the first value is a first threshold value or greater, obtaining the frequency deviation estimation result from a combination of the first value of the frequency deviation estimated by the first estimator and a second value of the frequency deviation estimated by the second estimator when the first value is less than the first threshold value and greater than or equal to a second threshold value that is smaller than the first threshold value, and obtaining the frequency deviation estimation result from a combination of the first value of the frequency deviation estimated by the first estimator and a third value of the frequency deviation estimated by the third estimator when the first value is less than the second threshold value.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is a diagram illustrating a frequency deviation estimatable range and a number of usable subcarriers of each method in the normal CP;

FIG. 4 is a diagram illustrating the frequency deviation estimatable range and the number of usable subcarriers of each method in the extended CP;

FIG. 17 is a flow chart for explaining the PUSCH reception process in the extended CP in the embodiment.

DESCRIPTION OF EMBODIMENTS

Preferred embodiments of the present invention will be described with reference to the accompanying drawings.

<LTE System>

Figure 1:
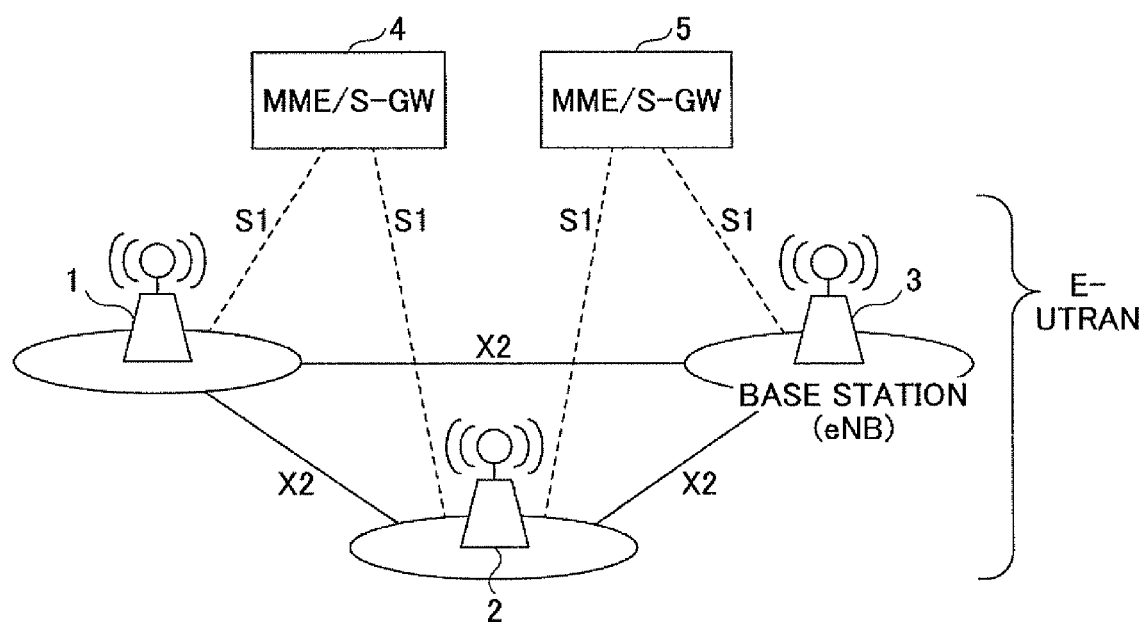
FIG. 1 is a diagram illustrating a system structure of a LTE system.

FIG. 1 is a diagram illustrating a system structure of a LTE (Long Term Evolution) system. In FIG. 1, base stations (eNBs) 1, 2, and 3 may form an E-UTRAN (Evolved Universal Terrestrial Radio Access Network). Each of the base stations 1, 2, and 3 may be connected to MME/S-GWs (Mobility Management Entity/Serving-Gateways) 4 and 5.

The following three methods are conceivable as the frequency deviation estimating method using a RS (Reference Signal) periodically transmitted from a mobile terminal (UE: User Equipment) in the base stations 1, 2, and 3 of the LTE.

A first method uses a reference signal for demodulation (or reference signal to be used for demodulation) in a control data transmission channel, namely, a D-RS (Demodulation-reference Signal) in a PUCCH (Physical Uplink Control Channel).

A second method uses a reference signal for demodulation (or reference signal to be used for demodulation) in a user data transmission channel, namely, a D-RS in a PUSCH (Physical Uplink Shared Channel).

A third method uses a reference signal for estimating channel quality (or reference signal to be used for estimating channel quality) in the user data transmission channel, namely, a S-RS (Sounding-reference Signal) in the PUSCH.

Figure 2:
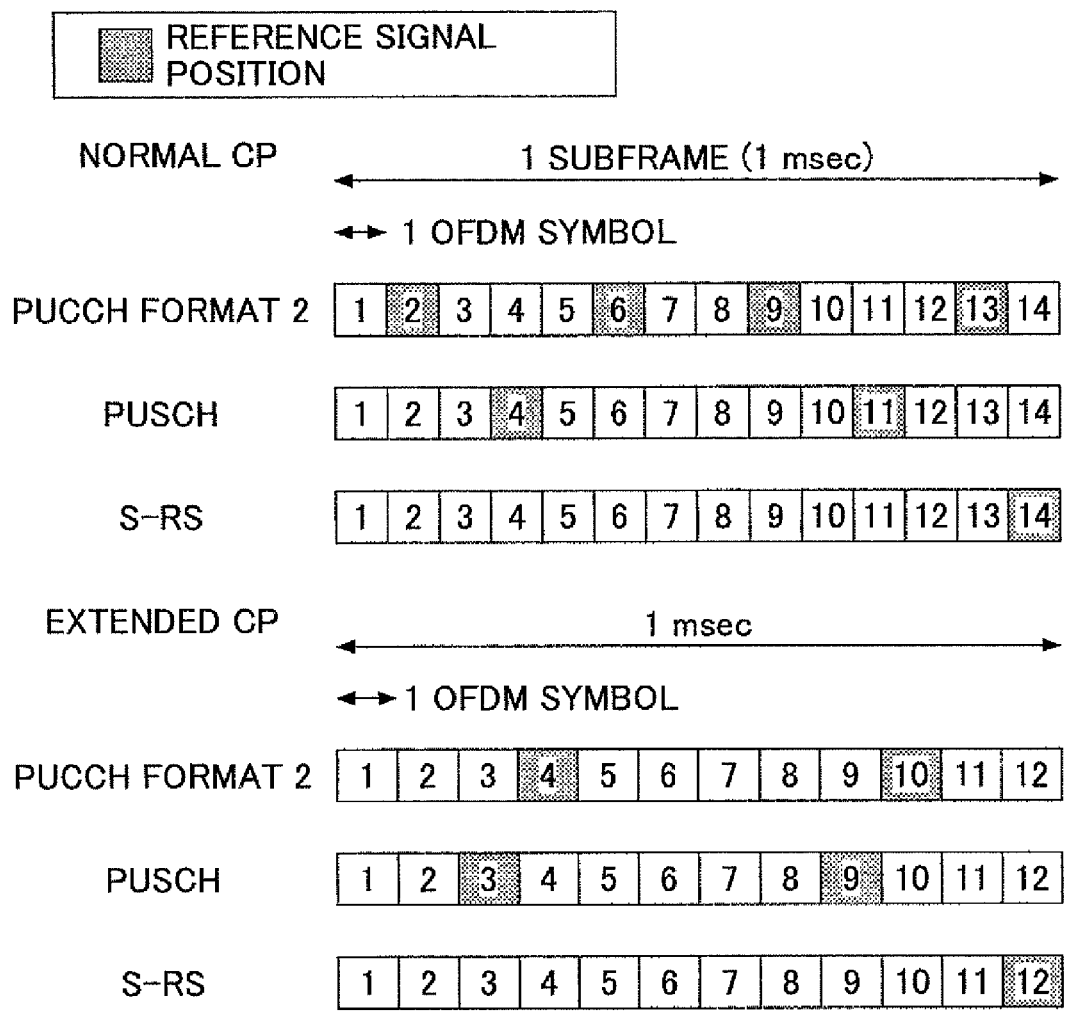
FIG. 2 is a diagram illustrating RS positions in a normal CP and an extended CP.

FIG. 2 is a diagram illustrating RS (Reference Signal) positions in a normal CP (Cyclic Prefix) and an extended CP (Cyclic Prefix). FIG. 2 illustrates, by a halftone dot meshing, D-RS positions of the PUCCH Format 2, and D-RS positions and S-RS positions of the PUSCH, in the normal CP having 14 OFDM symbols in 1 subframe (1 TTI (Transmission Time Interval)=1 msec). FIG. 2 also illustrates, by the halftone dot meshing, the D-RS positions of the PUCCH Format 2, and the RS positions and the S-RS positions of the PUSCH, in the extended CP having 12 OFDM symbols in 1 subframe.

In the normal CP, the transmission periods of the D-RD of the PUCCH Format 2 and the D-RS and the S-RS of the PUSCH are different. In the extended CP, the transmission periods of the D-RS of the PUCCH Format 2 and the D-RS of the PUSCH are the same, however, the transmission period of the S-RS of the PUSCH is different from the transmission periods of the D-RS of the PUCCH Format 2 and the D-RS of the PUSCH.

FIG. 3 is a diagram illustrating a frequency deviation estimatable range and a number of usable subcarriers (or frequency direction) computable by each of the methods described above in the normal CP, where the frequency deviation estimatable range refers to the range in which the frequency deviation is computable by each method from a phase difference (or phase error) of the D-RSs or the S-RSs in the normal CP. FIG. 4 is a diagram illustrating the frequency deviation estimatable range and the number of usable subcarriers (or frequency direction) computable by each of the methods described above in the extended CP, where the frequency deviation estimatable range refers to the range in which the frequency deviation is computable by each method from a phase difference (or phase error) of the D-RSs or the S-RSs in the extended CP. For the first and second methods described above, FIGS. 3 and 4 illustrate the frequency deviation estimatable range and the number of usable subcarriers computable using the RSs within 1 subframe.

According to the frequency deviation estimation using the D-RS of the PUCCH Format 2 in the normal CP, the frequency deviation estimating range becomes wide as illustrated in FIG. 3. However, the number of usable subcarriers in the PUCCH per 1 UE is 12 in the frequency direction and fixed. For this reason, the effect of suppressing interference by averaging the frequency direction deteriorates, and the accuracy of the frequency deviation estimation deteriorates when compared to the case in which the D-RS or the S-RS of the PUSCH is used (that is, the case in which the number of usable subcarriers per 1 UE is 12 or greater in the frequency direction).

According to the frequency deviation estimation using the D-RS or the S-RS of the PUSCH, the effect of suppressing the interference by the averaging of the frequency direction may be increased by allocating a large number of subcarriers, as illustrated in FIG. 4. However, the frequency deviation estimating range becomes narrower when compared to the frequency deviation estimation using the D-RS of the PUCCH Format 2.

<Structure of Base Station Apparatus>

Figure 5:
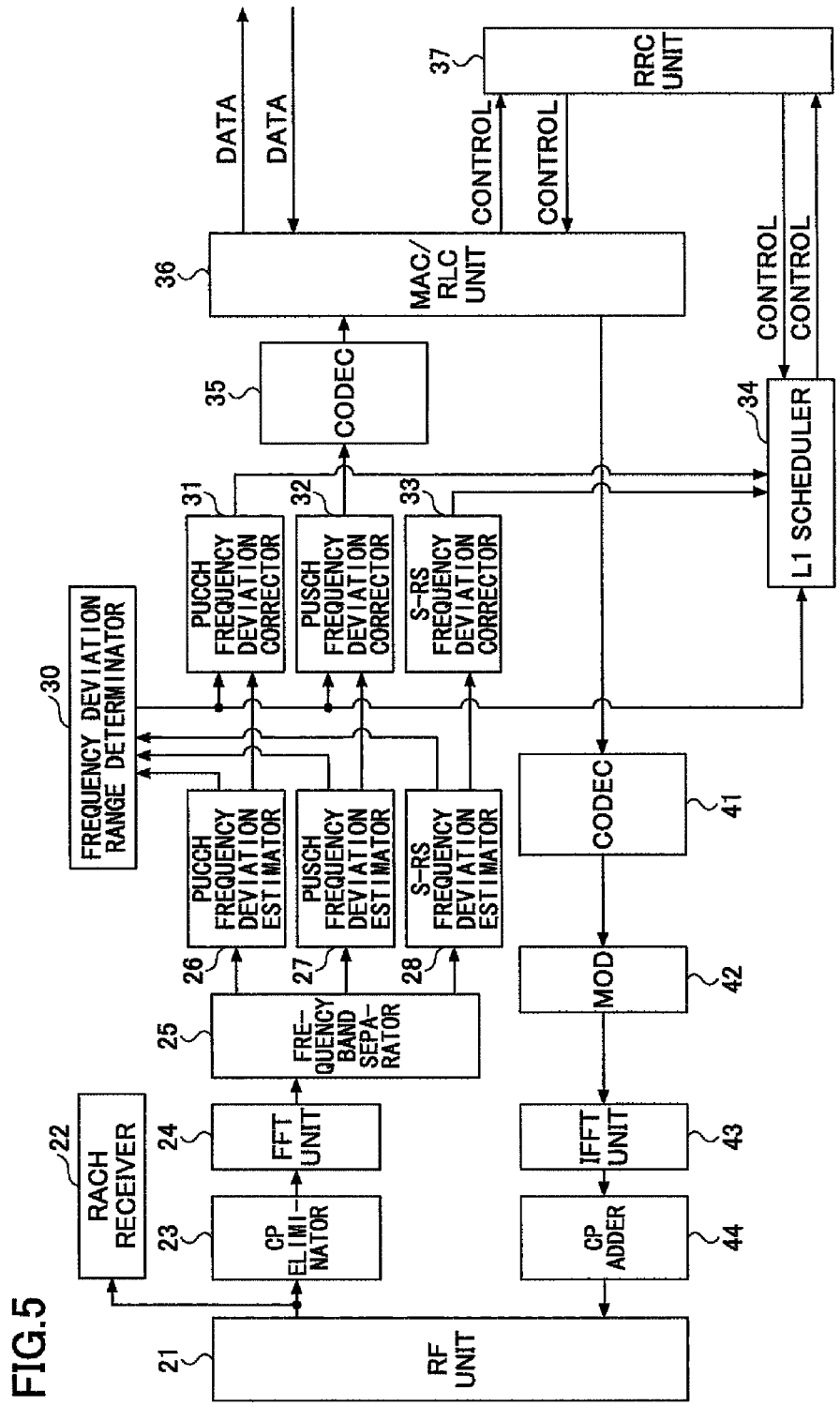
FIG. 5 is a diagram illustrating a structure of a base station apparatus in the LTE system in an embodiment.

FIG. 5 is a diagram illustrating a structure of a base station apparatus in the LTE system in an embodiment. In FIG. 5, a RF (Radio Frequency) unit 21 exchanges radio signals with a mobile terminal (UE). Uplink signals received by the RF unit 21 are supplied to a RACH (Random Access Channel) receiver 22 and a CP eliminator 23. The RACH receiver 22 performs a reception process of a RACH (Random Access Channel).

The CP eliminator 23 eliminates the CP (Cyclic Prefix) from the reception signal before supplying the reception signal to a FFT (Fast Fourier Transform) unit 24. The FFT unit 24 performs a Fourier transform on the reception signal in order to transform the signal in the time region into a signal in a frequency region, before supplying the reception signal to a frequency band separator 25.

Figure 6:
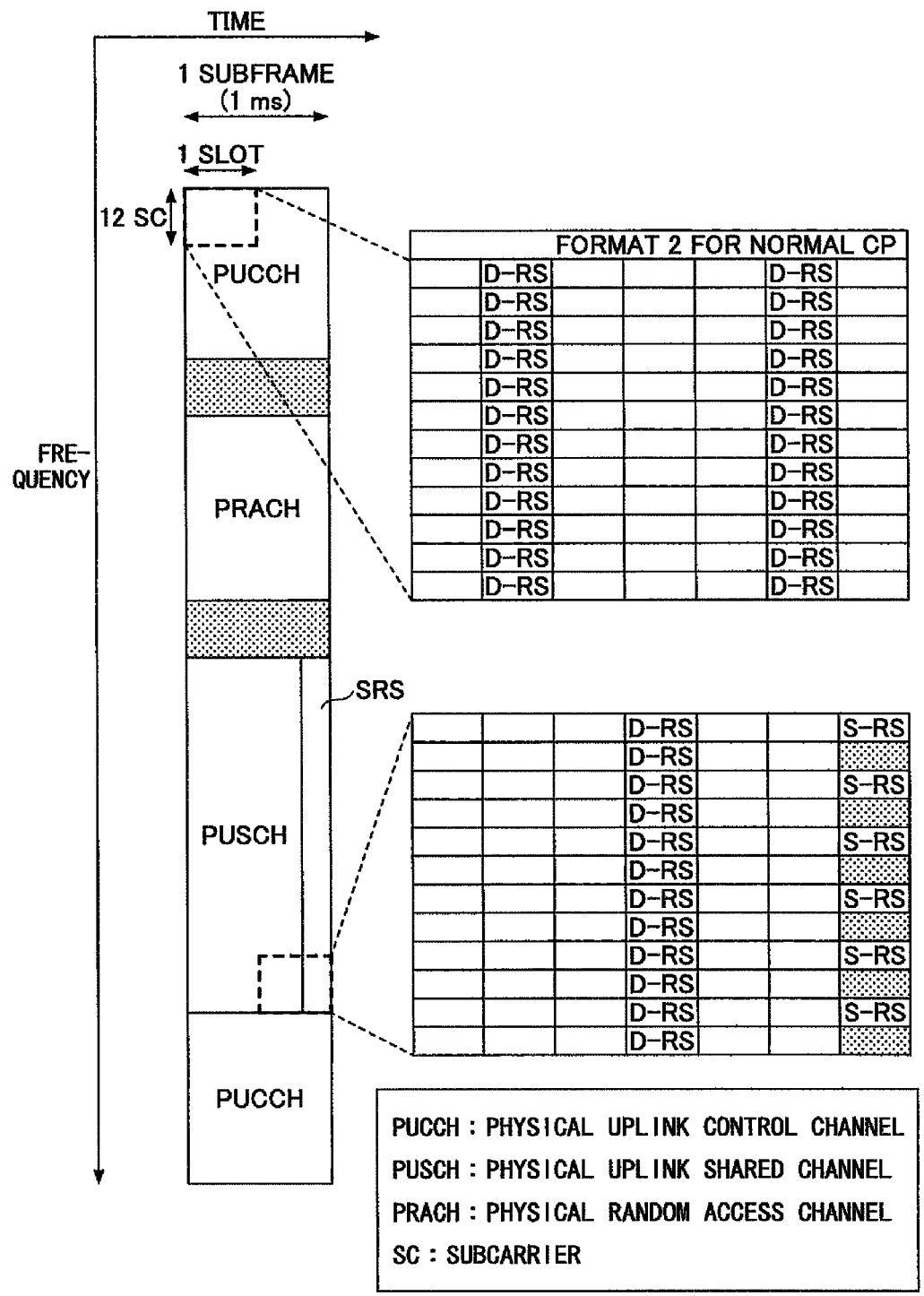
FIG. 6 is a diagram illustrating an allocation of an uplink physical channel in the normal CP of the LTE system in an embodiment.

FIG. 6 is a diagram illustrating an allocation of an uplink physical channel in the normal CP of the LTE system in an embodiment. The output signal of the FFT unit 24 has a structure illustrated in FIG. 6. FIG. 6 illustrates the uplink physical channel of 1 subframe in a direction of the time axis (or time base). The control data transmission channel, PUCCH, is arranged in an upper part and a lower part along a direction of the frequency axis, and a PRACH (Physical Random Access Channel) and the user data transmission channel, PUSCH, are arranged between the PUCCHs.

As illustrated on an enlarged scale in the top right part of FIG. 6, the reference signals for demodulation, D-RSs, amounting to 2 symbols (second and sixth symbols) are included in 1 resource block (=1 slot×12 subcarriers) in time slots before and after the PUCCH along the time axis. In addition, as illustrated on an enlarged scale in the bottom right part of FIG. 6, the reference signals for demodulation, D-RSs, amounting to 1 symbol (fourth symbol) are included in 1 resource block in the time slot after the PUSCH along the time axis, and the reference signals for estimating channel quality, S-RSs, amounting to 1 symbol (seventh symbol), are included in specific subcarriers (even numbered subcarriers in this example).

The frequency band separator 25 performs a frequency band separation on each of the PUCCH and the PUSCH, supplies the PUCCH to a PUCCH frequency deviation estimator 26, and supplies the PUSCH to a PUSCH frequency deviation estimator 27 and a S-RS frequency deviation estimator 28.

The PUCCH frequency deviation estimator 26 estimates (or computes) the frequency deviation from the D-RSs within 1 subframe of the PUCCH, supplies the estimated frequency deviation to a frequency deviation range determinator 30, and supplies the PUCCH to a PUCCH frequency deviation corrector 31. The PUSCH frequency deviation estimator 27 estimates (or computes) the frequency deviation from the D-RSs within a plurality of subframes of the PUSCH, supplies the estimated frequency deviation to the frequency deviation range determinator 30, and supplies the PUSCH to a PUSCH frequency deviation corrector 32. The S-RS frequency deviation estimator 28 estimates (or computes) the frequency deviation from the S-RSs within a plurality of subframes of the PUSCH, supplies the estimated frequency deviation to the frequency deviation range determinator 30, and supplies the estimated frequency deviation and the S-RS to a S-RS frequency deviation corrector 33.

Figure 7:
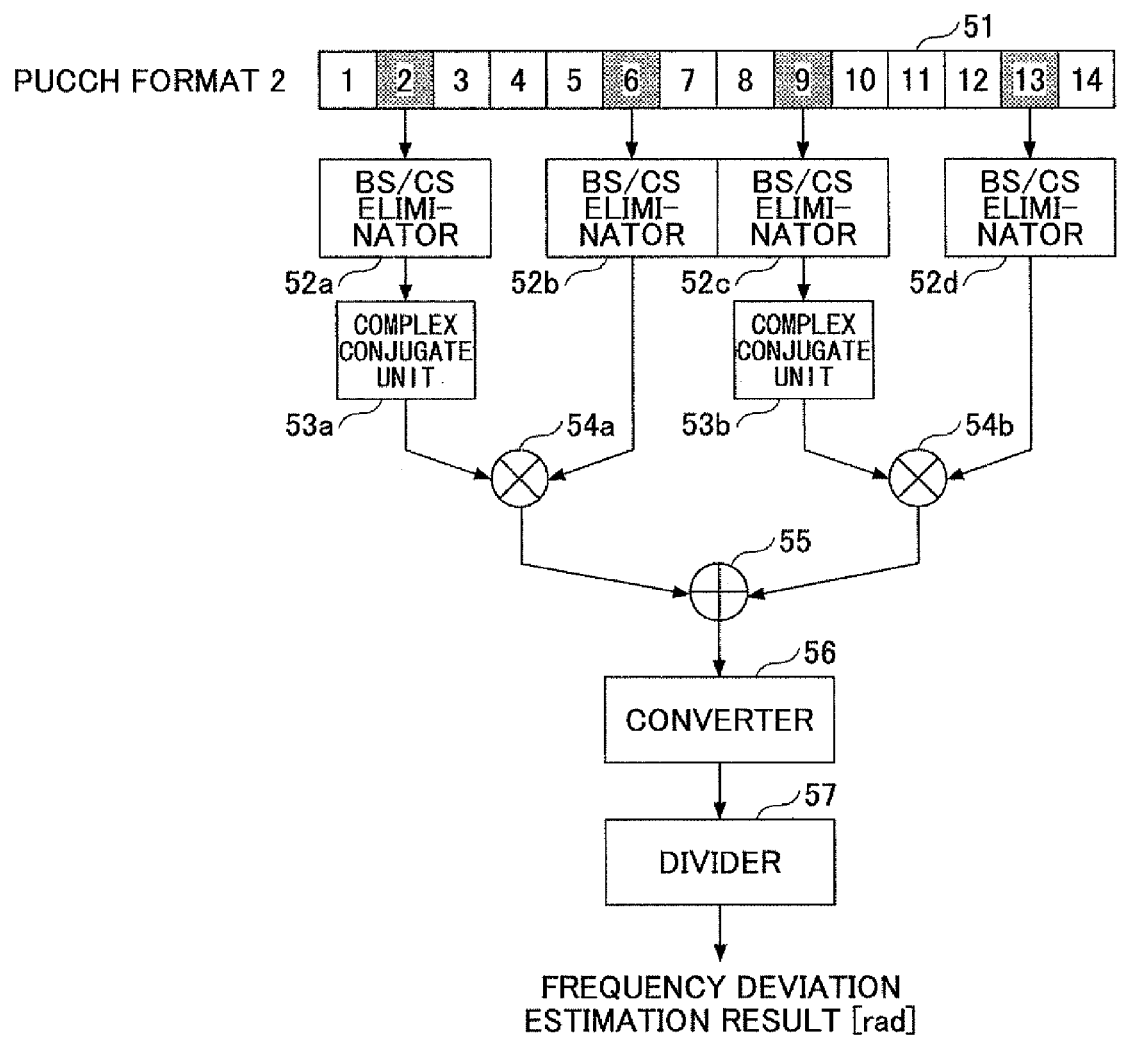
FIG. 7 is a diagram illustrating a structure of a PUCCH frequency deviation estimator in an embodiment.

FIG. 7 is a diagram illustrating a structure of the PUCCH frequency deviation estimator 26 in an embodiment. The PUCCH frequency deviation estimator 26 illustrated in FIG. 7 estimates the frequency deviation from the phase difference of the D-RSs of the PUCCH Format 2 in the normal CP. In FIG. 7, 14 PUCCH symbols that are received, amounting to 1 subframe of the normal CP, are successively shifted in a shift register 51. The second, sixth, ninth, and thirteenth symbols in the shift register 51 are supplied to BS/CS (Base Sequence/Cyclic Shift) eliminators 52a, 52b, 52c, and 52d, respectively. A memory, a flip-flop, and the like may be used in place of the shift register 51. A similar modification may be made in FIGS. 8 and 9 to be described later.

Each of the BS/CS eliminators 52a, 52b, 52c, and 52d performs an elimination process (or computation) on a base sequence and a cyclic shift. Output symbols of the BS/CS eliminators 52a and 52c are supplied to complex conjugate units 53a and 53b, respectively, and complex conjugates from the complex conjugate units 53a and 53b are supplied to complex multipliers 54a and 54b, respectively.

The complex multiplier 54a performs a complex multiplication of the output of the complex conjugate unit 53a and the output of the BS/CS eliminator 52b, in order to obtain a phase difference between the second symbol and the sixth symbol. The complex multiplier 54b performs a complex multiplication of the output of the complex conjugate unit 53b and the output of the BS/CS eliminator 52d, in order to obtain a phase difference between the ninth symbol and the thirteenth symbol.

The phase differences output from the complex multipliers 54a and 54b are added in a complex adder 55, in order to obtain an average value of the phase differences. A converter 56 converts the average value from the complex value into an angle (radians). A divider 57 divides the angle by 4 (that is, the number of symbols from the second symbol to the sixth symbol), and outputs a phase rotation (or amount of phase rotation) per 1 symbol.

The structure described above obtains a product of a known value (base sequence including cyclic shift) and the complex conjugate of the received D-RS. Hence, it may be regarded that the structure described above obtains the frequency deviation from a correlation value of the D-RSs.

Figure 8:
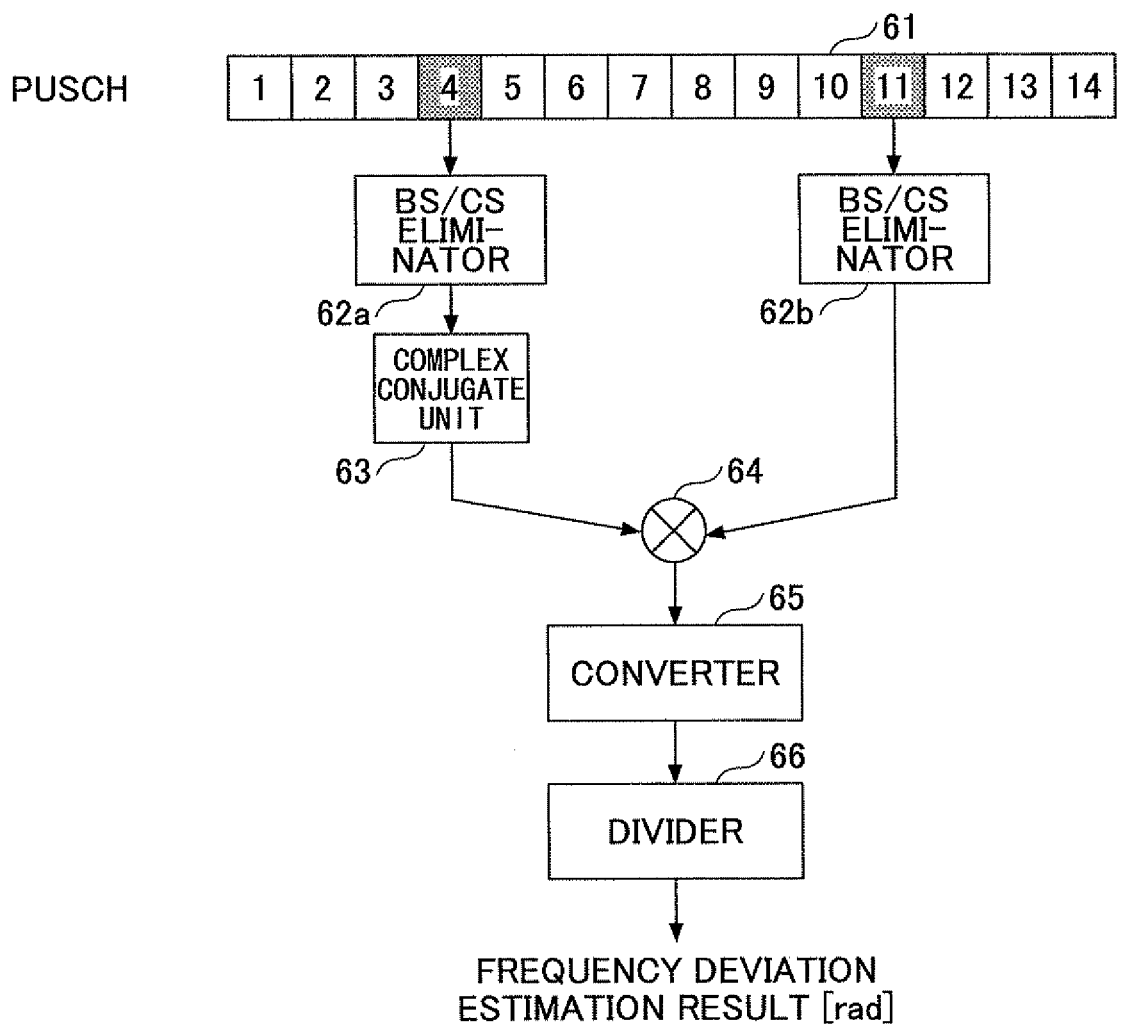
FIG. 8 is a diagram illustrating a structure of a PUSCH frequency deviation estimator in an embodiment.

FIG. 8 is a diagram illustrating a structure of the PUSCH frequency deviation estimator 27 in an embodiment. The PUSCH frequency deviation estimator 27 illustrated in FIG. 8 estimates the frequency deviation from the phase difference between the D-RSs of the PUSCH in the normal CP. In FIG. 8, 14 PUSCH symbols that are received, amounting to 1 subframe of the normal CP, are successively shifted in a shift register 61. The fourth and eleventh symbols in the shift register 61 are supplied to BS/CS eliminators 62a and 62b, respectively.

Each of the BS/CS eliminators 62a and 62b performs an elimination process (or computation) on a base sequence and a cyclic shift. Output symbols of the BS/CS eliminator 62a are supplied to a complex conjugate unit 63, and a complex conjugate from the complex conjugate unit 63 is supplied to a complex multiplier 64. The complex multiplier 64 performs a complex multiplication of the output of the complex conjugate unit 63 and the output of the BS/CS eliminator 62b, in order to obtain a phase difference between the first symbol and the tenth symbol.

The phase difference output from the complex multiplier 64 is supplied to a converter 65 which converts the phase difference from the complex value into an angle (radians). A divider 66 divides the angle by 7 (that is, the number of symbols from the fourth symbol to the eleventh symbol), and outputs a phase rotation (or amount of phase rotation) per 1 symbol.

Figure 9:
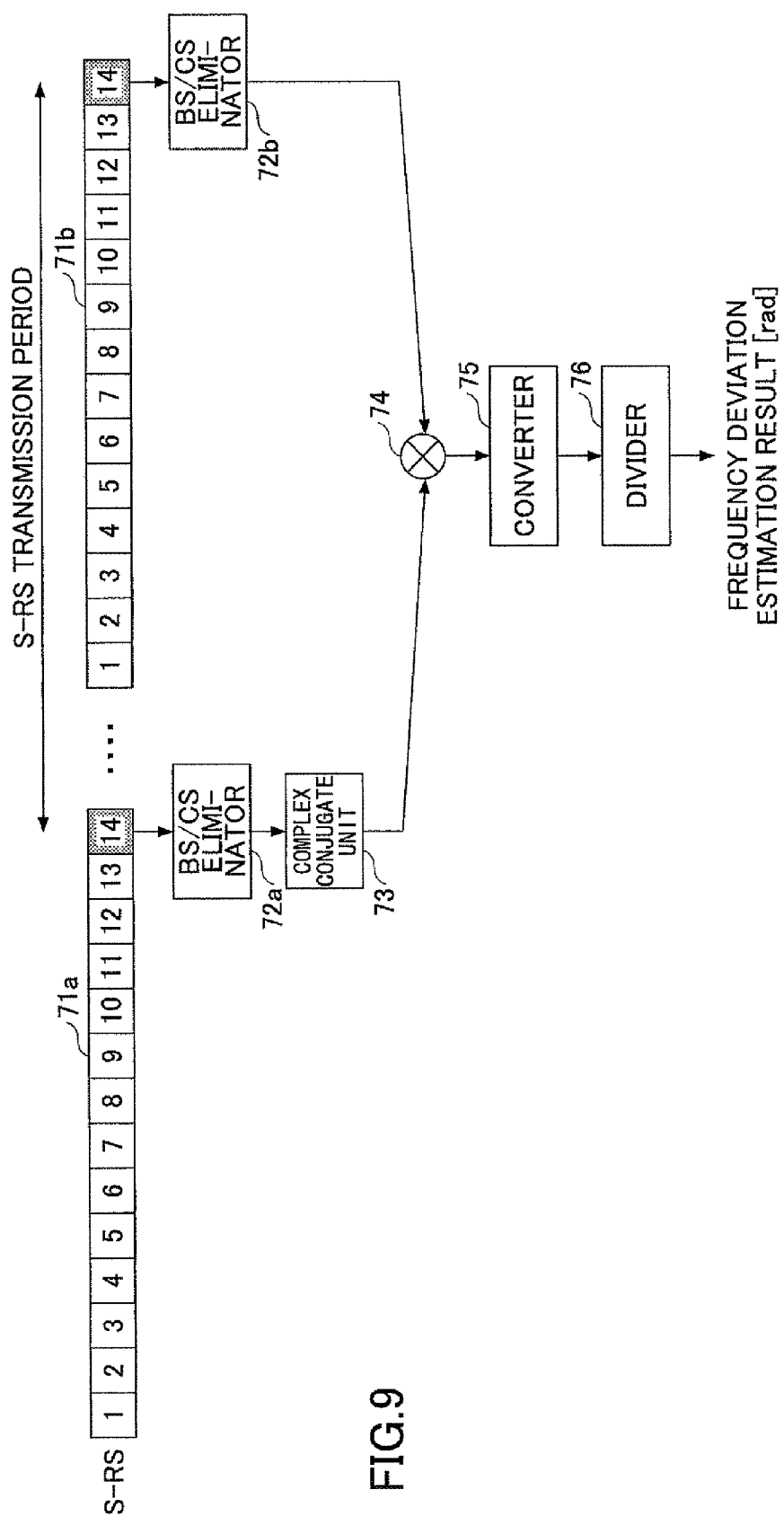
FIG. 9 is a diagram illustrating a structure of a S-RS frequency deviation estimator in an embodiment.

FIG. 9 is a diagram illustrating a structure of the S-RS frequency deviation estimator 28 in an embodiment. The S-RS frequency deviation estimator 28 illustrated in FIG. 9 estimates the frequency deviation from the phase difference of the S-RSs of the PUSCH in the normal CP. In FIG. 9, 28 PUSCH symbols that are received, amounting to 2 subframes of the normal CP, are successively shifted in shift registers 71a and 71b. The fourteenth symbol in the shift register 71a is supplied to a BS/CS eliminator 72a, and the fourteenth symbol in the shift register 71b is supplied to a BS/CS eliminator 72b.

Each of the BS/CS eliminators 72a and 72b performs an elimination process (or computation) on a base sequence and a cyclic shift. Output symbols of the BS/CS eliminator 72a are supplied to a complex conjugate unit 73, and a complex conjugate from the complex conjugate unit 73 is supplied to a complex multiplier 74. The complex multiplier 74 performs a complex multiplication of the output of the complex conjugate unit 73 and the output of the BS/CS eliminator 72b, in order to obtain a phase difference between the fourteenth symbols.

The phase difference output from the complex multiplier 74 is supplied to a converter 75 which converts the phase difference from the complex value into an angle (radians). A divider 76 divides the angle by X (X=14×"S-RS transmission period"), and outputs a phase rotation (or amount of phase rotation) per 1 symbol. The S-RS transmission period may be in units of subframes.

Returning now to the description of FIG. 5, the frequency deviation range determinator 30 determines, according to the frequency deviation estimation result of the PUCCH frequency deviation estimator 26, whether the frequency deviation estimation result of the PUSCH frequency deviation estimator 27 and the frequency deviation estimation result of the S-RS frequency deviation estimator 28 are to be averaging targets, and obtains a frequency deviation estimation result by averaging the averaging target that is determined. The frequency deviation estimation result obtained by the frequency deviation range determinator 30 is supplied to a PUCCH frequency deviation corrector 31, a PUSCH frequency deviation corrector 32, and a L1 (Layer-1) scheduler 34.

When supplied with the frequency deviation estimation result, the PUCCH frequency deviation corrector 31 corrects the PUCCH frequency deviation, and the PUSCH frequency deviation corrector 32 corrects the PUSCH frequency deviation. The S-RS frequency deviation corrector 33 corrects the S-RS frequency deviation when supplied with the frequency deviation and the S-RS from the S-RS frequency deviation estimator 28.

The PUCCH output from the PUCCH frequency deviation corrector 31 and the S-RS output from the S-RS frequency deviation corrector 33 are supplied to the L1 scheduler 34. The PUSCH output from the PUSCH frequency deviation corrector 32 is output to a CODEC 35. The CODEC 35 decodes coded data included in the PUSCH in order to obtain uplink user data, and an output of the CODEC 35 is supplied to a MAC/RLC (Medium Access Control/Radio Link Control) unit 36.

The L1 scheduler 34 performs scheduling of the uplink and the downlink by selecting the modulation scheme, the code rate (or data rate), and the number of information bits to be transmitted in 1 modulation symbol, which may be optimized, according to a transmission request and channel quality information transmitted from the mobile terminal by the PUCCH. In addition, the L1 scheduler 34 monitors the channel quality for each subcarrier by detecting a timing difference (or timing error) between the S-RS transmitted from the mobile terminal and the S-RS timing retained in the base station apparatus, and performs a control including allocating the subcarrier with a satisfactory channel quality to the mobile terminal. Further, the L1 scheduler 34 creates from the frequency deviation estimation result a modify request to request modifying of the S-RS transmission period, and supplies the modify request to a RRC (Radio Resource Control) unit 37. The RRC unit 37 supplies control information of the modified S-RS transmission period (in units of subframes) to the L1 scheduler 34, in response to the modify request.

The MAC/RLC unit 36 supplies the uplink user data supplied from the CODEC 35 to a host unit (not illustrated), and supplies the downlink user data supplied from the host unit to a CODEC 41. Moreover, the MAC/RLC unit 36 receives control information supplied from the RRC unit 37.

The CODEC 41 codes the downlink user data. The coded downlink user data is modulated in a modulator (MOD) 42, and subjected to an inverse Fourier transform in an IFFT (Inverse Fast Fourier Transform) unit 43, in order to transform the signal in the frequency region into a signal in a time region. An output of the IFFT unit 43 is supplied to a CP adder 44. The CP adder 44 adds a CP (Cyclic Prefix) to the signal in the time region. An output signal of the CP adder 44 is supplied to the RF unit 21, and the RF unit 21 transmits a radio signal to the mobile terminal (UE).

<Process in Normal CP>

Figure 10:
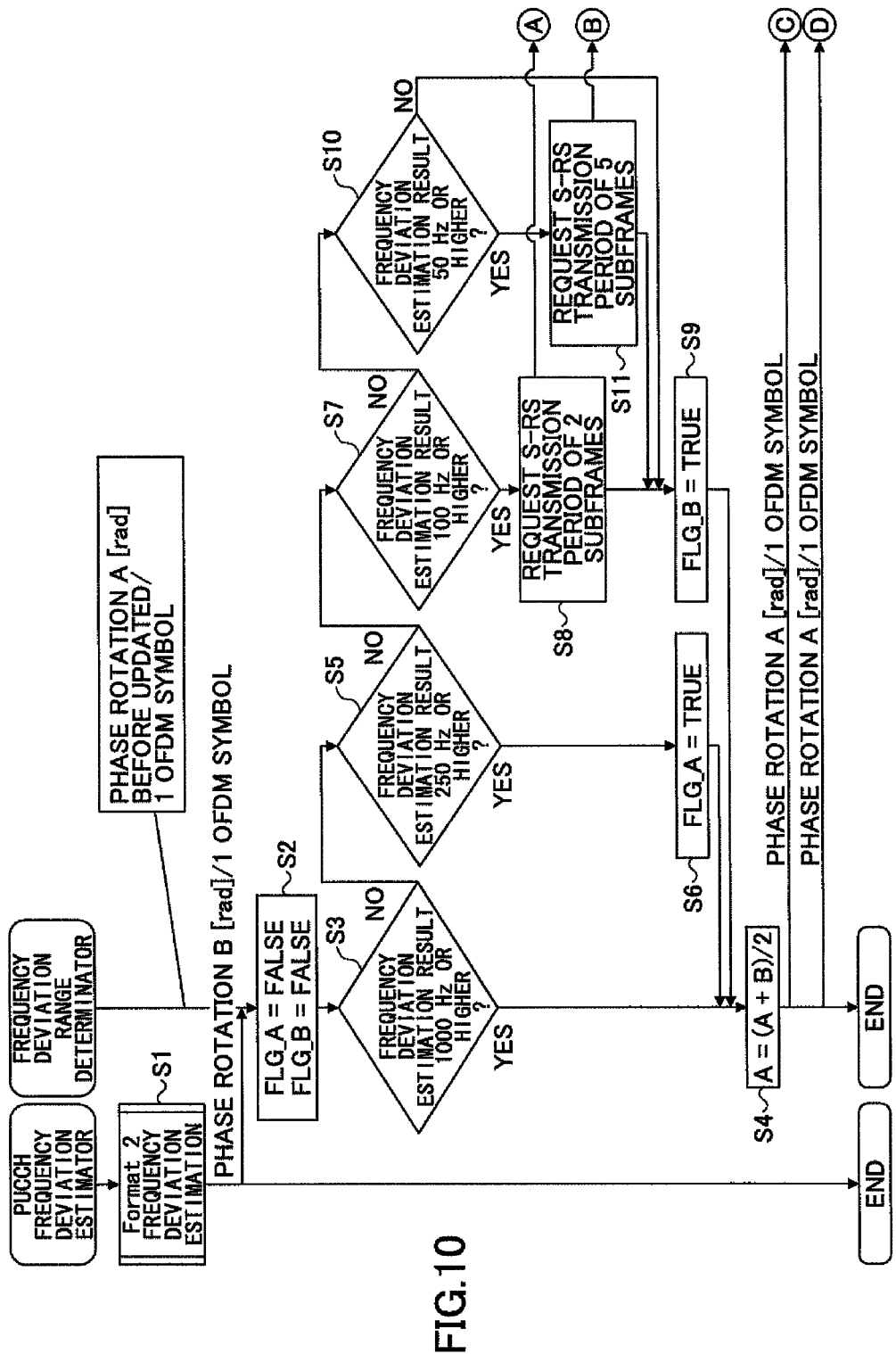
FIG. 10 is a flow chart for explaining a PUCCH Format 2 reception process in the normal CP in an embodiment.
Figure 11:
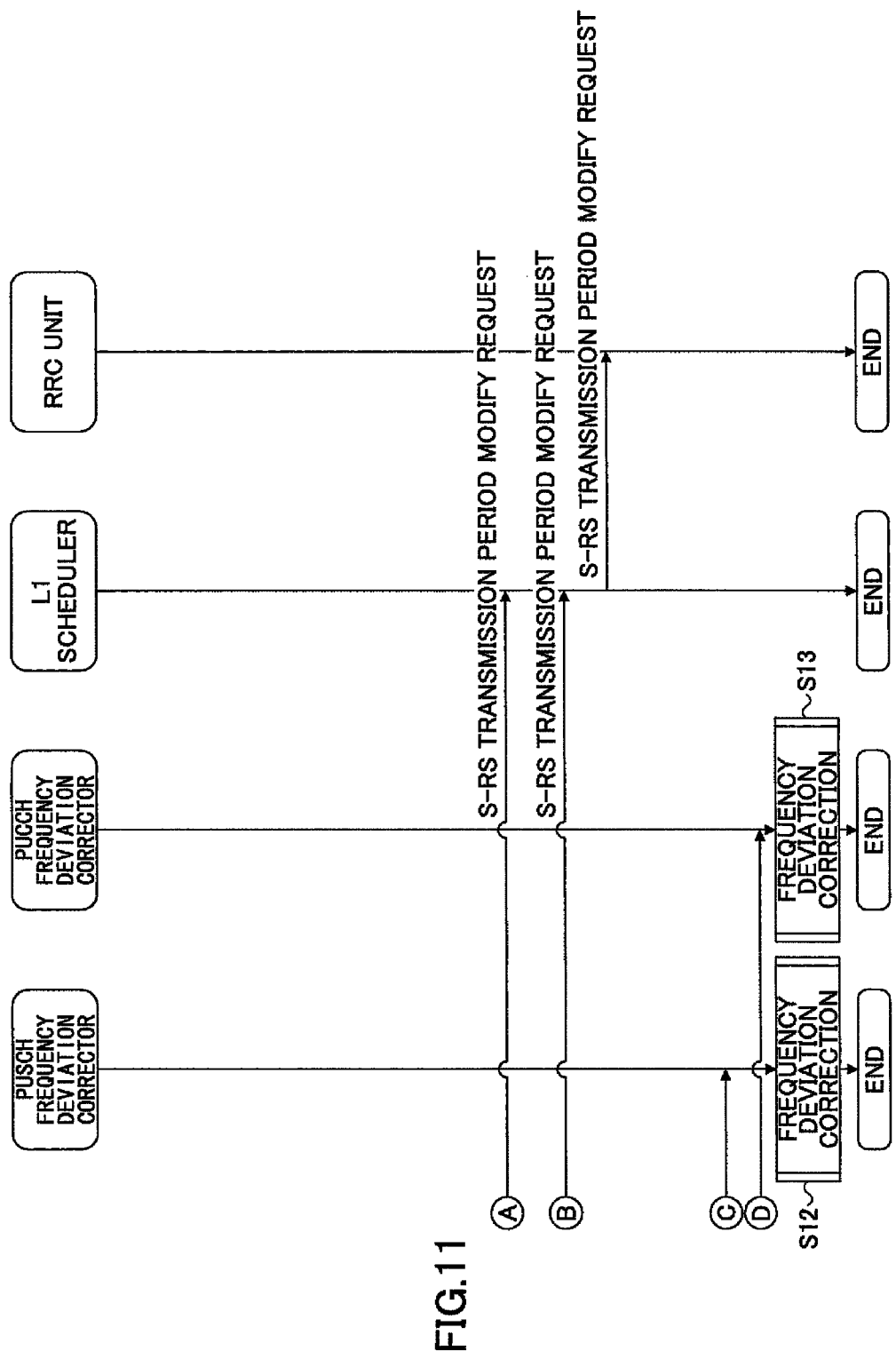
FIG. 11 is a flow chart for explaining the PUCCH Format 2 reception process in the normal CP in the embodiment.

FIGS. 10 and 11 are flow charts for explaining a PUCCH Format 2 reception process in the normal CP in an embodiment. In a step S1 illustrated in FIG. 10, the PUCCH frequency deviation estimator 26 estimates the frequency deviation from the phase difference of the D-RSs of the PUCCH Format 2 in the normal CP, and supplies a phase rotation B obtained during the frequency deviation estimation to the frequency deviation range determinator 30.

The frequency deviation range determinator 30 retains a phase rotation A before the updating. In a step S2, the frequency deviation range determinator 30 sets an estimation flag FLG_A and an estimation flag FLG_B to "FALSE".

Thereafter, in a step S3, the frequency deviation range determinator 30 judges whether the frequency deviation estimation result (value according to the phase rotation B) is 1000 Hz or higher. When a judgement result in the step S3 is YES, a step S4 averages the phase rotation A and the phase rotation B to update the value to a new phase rotation A (that is, updated value). This new phase rotation A (updated value) is supplied to the PUCCH frequency deviation corrector 31 and the PUSCH frequency deviation corrector 32.

On the other hand, when the judgement result in the step S3 is NO, the frequency deviation range determinator 30 judges in a step S5 whether the frequency deviation estimation result is 250 Hz or higher. When a judgement result in the step S5 is YES, a step S6 sets the estimation flag FLG_A to "TRUE", and the step S4 averages the phase rotation A and the phase rotation B to update the value to a new phase rotation A (that is, updated value). This new phase rotation A (updated value) is supplied to the PUCCH frequency deviation corrector 31 and the PUSCH frequency deviation corrector 32.

When the judgement result in the step S5 is NO, the frequency deviation range determinator 30 judges in a step S7 whether the frequency deviation estimation result is 100 Hz or higher. When a judgement result in the step S7 is YES, a step S8 supplies to the L1 scheduler 34 a modify request to request modifying of the S-RS transmission period to 2 subframes. Initially, the S-RS transmission period is 1 subframe. A step S9 sets the estimation flag FLG_B to "TRUE", and the step S4 averages the phase rotation A and the phase rotation B to update the value to a new phase rotation A (that is, updated value). This new phase rotation A (updated value) is supplied to the PUCCH frequency deviation corrector 31 and the PUSCH frequency deviation corrector 32.

On the other hand, when the judgement result in the step S7 is NO, a step S10 judges whether the frequency deviation estimation result is 50 Hz or higher. When a judgement result in the step S10 is YES, a step S11 supplies to the L1 scheduler 34 a modify request to request modifying of the S-RS transmission period to 5 subframes, and the process advances to the step S9. When the judgement result in the step S10 is NO, the process advances to the step S9. The step S9 sets the estimation flag FLG_B to "TRUE", and the step S4 averages the phase rotation A and the phase rotation B to update the value to a new phase rotation A (that is, updated value). This new phase rotation A (updated value) is supplied to the PUCCH frequency deviation corrector 31 and the PUSCH frequency deviation corrector 32.

The PUSCH frequency deviation corrector 32 supplied with the phase rotation A (updated value) performs the frequency deviation correction in a step S12 illustrated in FIG. 11, and the PUCCH frequency deviation corrector 31 supplied with the phase rotation A (updated value) performs the frequency deviation correction in a step S13 illustrated in FIG. 11. The L1 scheduler 34 that receives the modify request to request modifying of the S-RS transmission period from the frequency deviation range determinator 30, supplies the modify request to the RRC unit 37.

Figure 12:
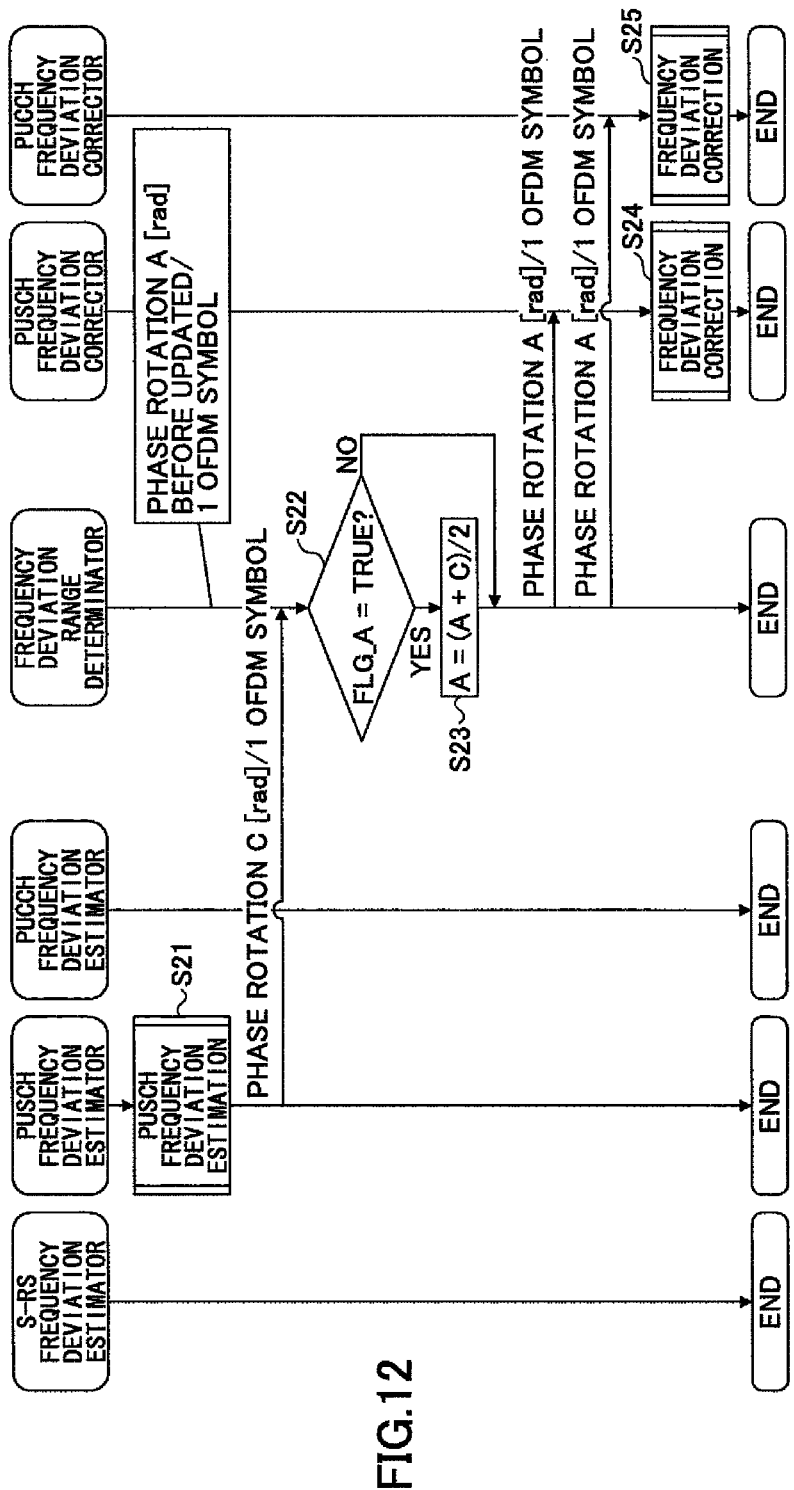
FIG. 12 is a flow chart for explaining a PUSCH reception process in the normal CP in an embodiment.

FIG. 12 is a flow chart for explaining a PUSCH reception process in the normal CP in an embodiment. In a step S21 illustrated in FIG. 12, the PUSCH frequency deviation estimator 27 estimates the frequency deviation from the phase difference of the D-RSs in the normal CP, and supplies a phase rotation C obtained during the frequency deviation estimation to the frequency deviation range determinator 30.

The frequency deviation range determinator 30 retains a phase rotation A before the updating. In a step S22, the frequency deviation range determinator 30 judges whether an estimation flag FLG_A is set to "TRUE". When a judgement result in the step S22 is YES, a step S23 averages the phase rotation A and the phase rotation C to update the value to a new phase rotation A (that is, updated value). This new phase rotation A (updated value) is supplied to the PUCCH frequency deviation corrector 31 and the PUSCH frequency deviation corrector 32.

The PUSCH frequency deviation corrector 32 supplied with the phase rotation A (updated value) performs the frequency deviation correction in a step S24, and the PUCCH frequency deviation corrector 31 supplied with the phase rotation A (updated value) performs the frequency deviation correction in a step S25.

Figure 13:
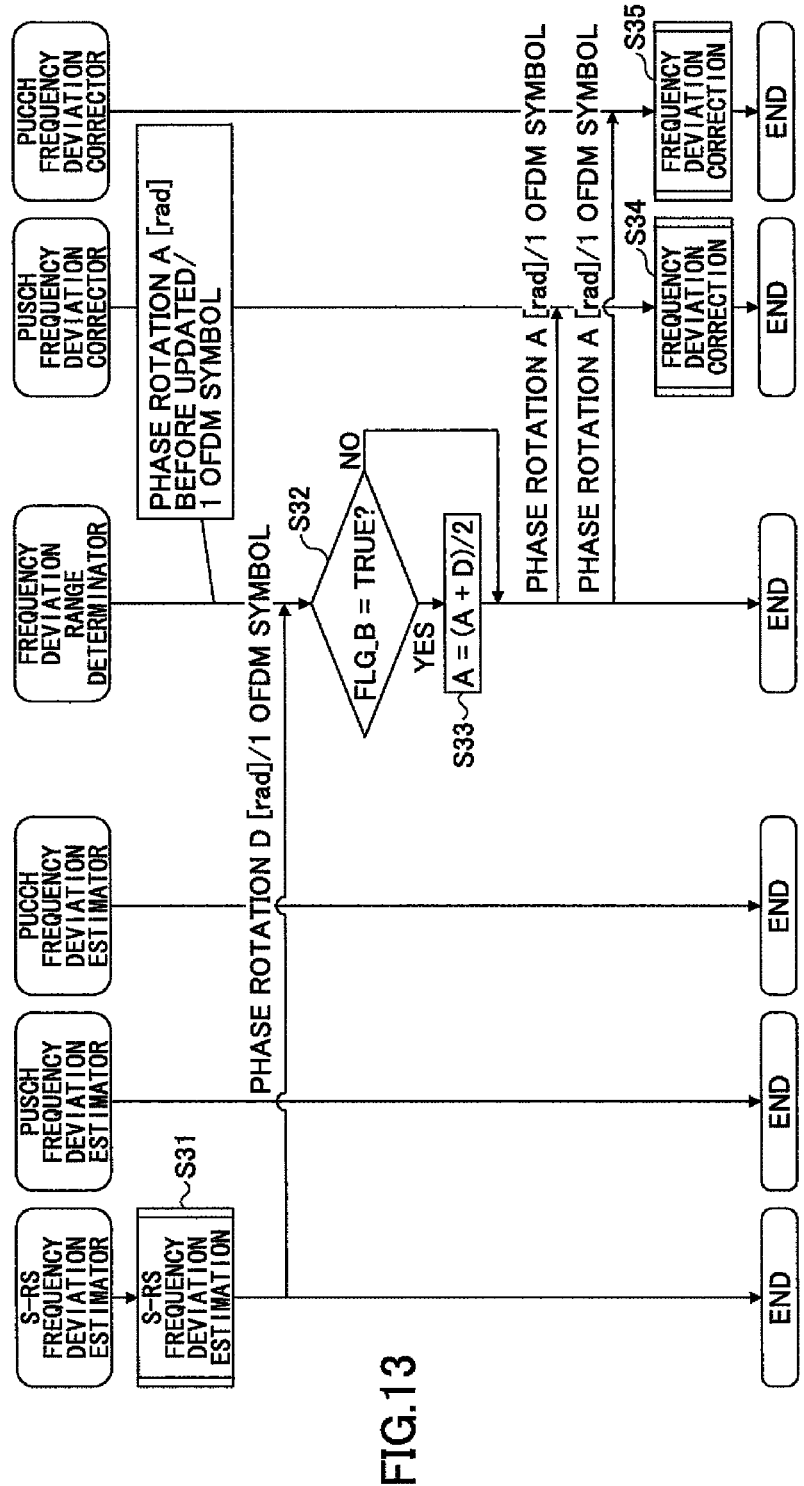
FIG. 13 is a flow chart for explaining a S-RS reception process in the normal CP in an embodiment.

FIG. 13 is a flow chart for explaining a S-RS reception process in the normal CP in an embodiment. In a step S31 illustrated in FIG. 13, the S-RS frequency deviation estimator 28 estimates the frequency deviation from the phase difference of the S-RSs in the normal CP, and supplies a phase rotation D obtained during the frequency deviation estimation to the frequency deviation range determinator 30.

The frequency deviation range determinator 30 retains a phase rotation A before the updating. In a step S32, the frequency deviation range determinator 30 judges whether an estimation flag FLG_B is set to "TRUE". When a judgement result in the step S32 is YES, a step S33 averages the phase rotation A and the phase rotation D to update the value to a new phase rotation A (that is, updated value). This new phase rotation A (updated value) is supplied to the PUCCH frequency deviation corrector 31 and the PUSCH frequency deviation corrector 32.

The PUSCH frequency deviation corrector 32 supplied with the phase rotation A (updated value) performs the frequency deviation correction in a step S34, and the PUCCH frequency deviation corrector 31 supplied with the phase rotation A (updated value) performs the frequency deviation correction in a step S35.

<Process in Extended CP>

In the extended CP, the number of OFDM symbols in 1 subframe and the RS positions are different from those of the normal CP. In addition, the estimation flag FLG_A may be unnecessary, because the frequency deviation estimating range using the D-RS of the PUCCH Format 2 and the frequency deviation estimating range using the D-RS of the PUSCH are the same.

Figure 14:
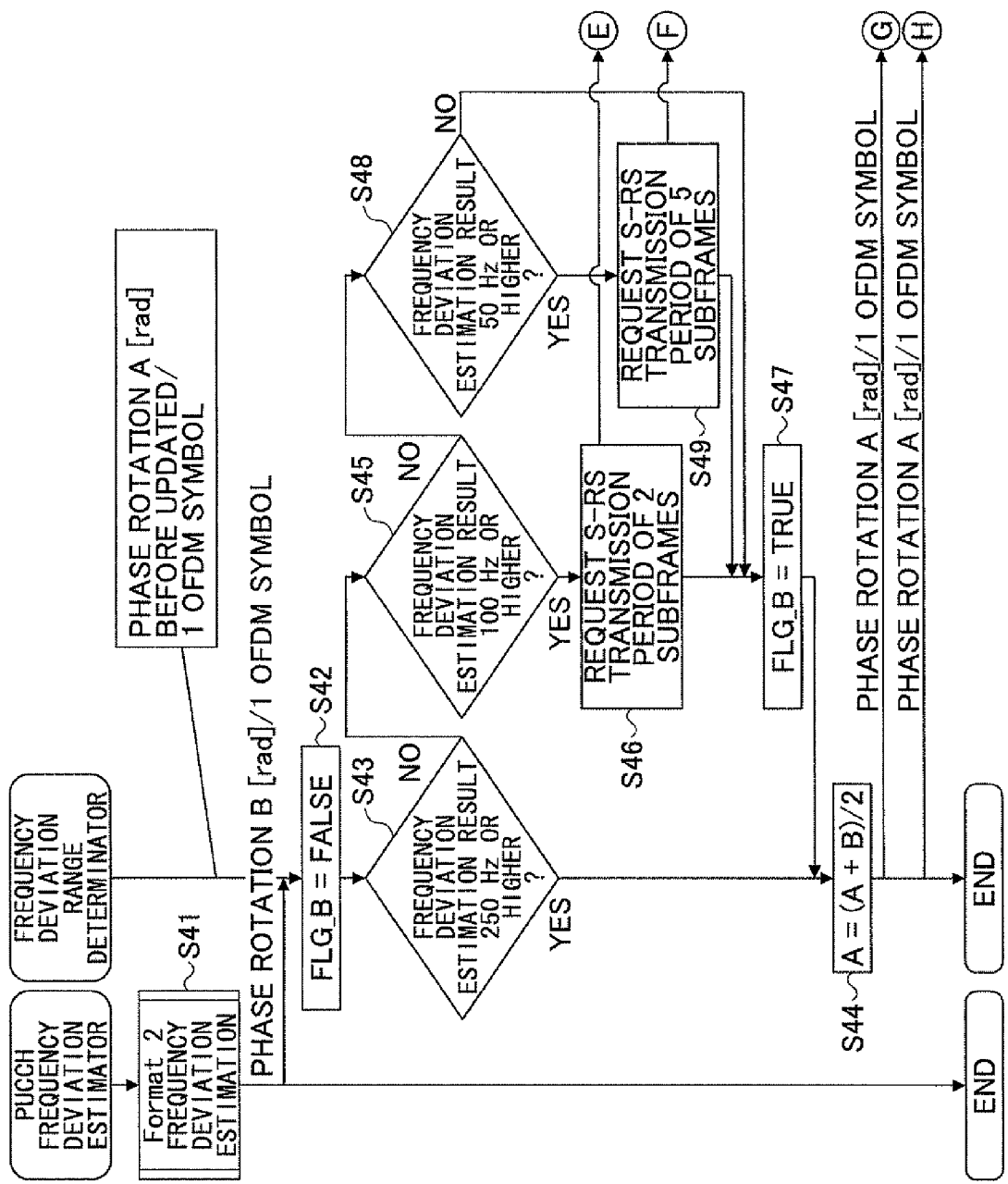
FIG. 14 is a flow chart for explaining a PUCCH Format 2 reception process in the extended CP in an embodiment.
Figure 15:
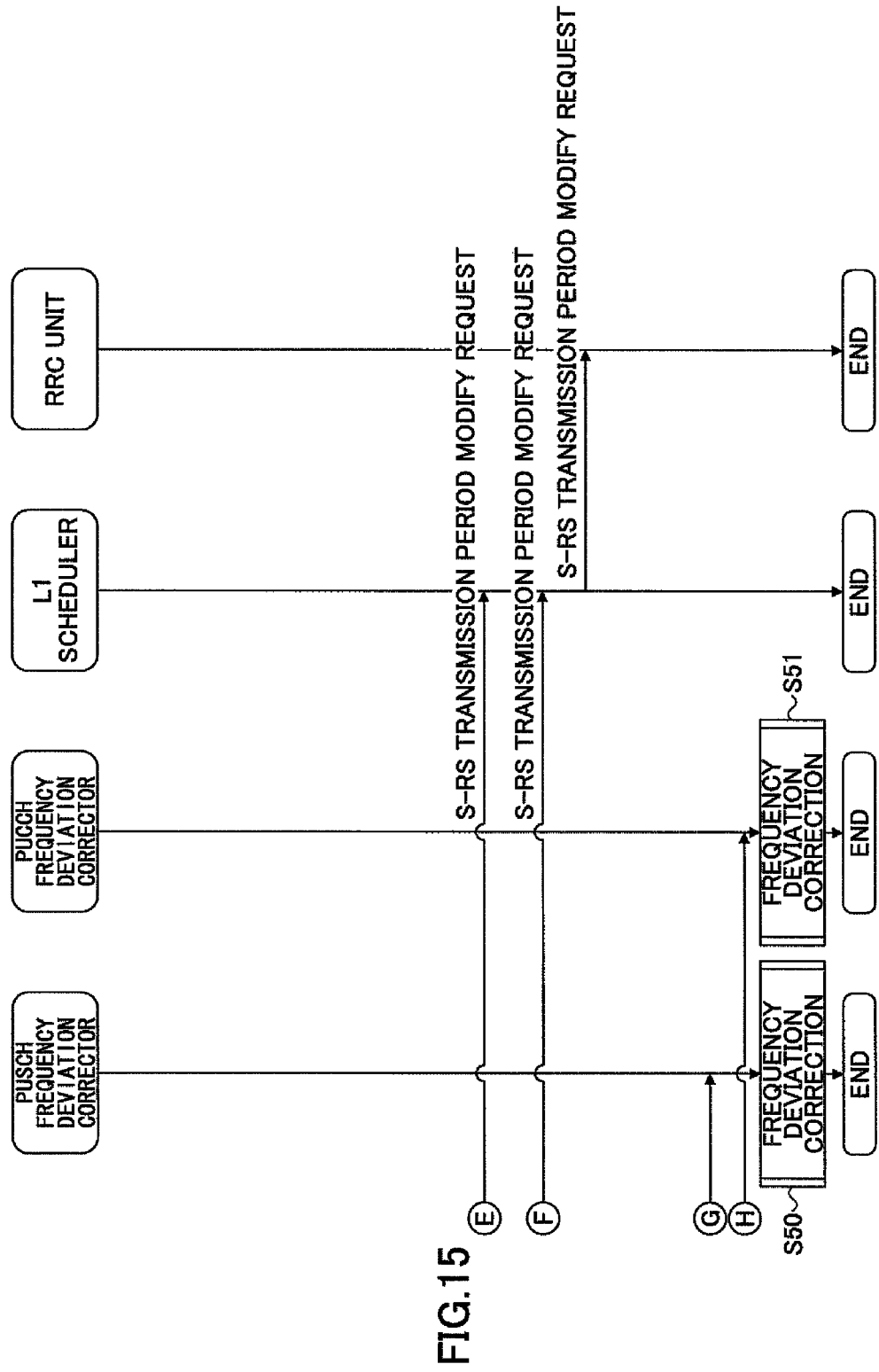
FIG. 15 is a flow chart for explaining the PUCCH Format 2 reception process in the extended CP in the embodiment.

FIGS. 14 and 15 are flow charts for explaining a PUCCH Format 2 reception process in the extended CP in an embodiment. In a step S41 illustrated in FIG. 14, the PUCCH frequency deviation estimator 26 estimates the frequency deviation from the phase difference of the D-RSs of the PUCCH Format 2 in the extended CP, and supplies a phase rotation B obtained during the frequency deviation estimation to the frequency deviation range determinator 30.

The frequency deviation range determinator 30 retains a phase rotation A before the updating. In a step S42, the frequency deviation range determinator 30 sets an estimation flag FLG_B to "FALSE", and in a step S43, judges whether the frequency deviation estimation result (according to the value of the phase rotation B) is 250 Hz or higher. When a judgement result in the step S43 is YES, a step S44 averages the phase rotation A and the phase rotation B to update the value to a new phase rotation A (that is, updated value). This new phase rotation A (updated value) is supplied to the PUCCH frequency deviation corrector 31 and the PUSCH frequency deviation corrector 32.

When the judgement result in the step S43 is NO, a step S45 judges whether the frequency deviation estimation result is 100 Hz or higher. When a judgement result in the step S45 is YES, a step S46 supplies a modify request to the L1 scheduler 34 to request modifying of the S-RS transmission period to 2 subframes. Initially, the S-RS transmission period is 1 subframe. A step S47 sets the estimation flag FLG_B to "TRUE", and a step S44 averages the phase rotation A and the phase rotation B to update the value to a new phase rotation A (that is, updated value). This new phase rotation A (updated value) is supplied to the PUCCH frequency deviation corrector 31 and the PUSCH frequency deviation corrector 32.

On the other hand, when the judgement result in the step S45 is NO, in a step S48 the frequency deviation range determinator 30 judges whether the frequency deviation estimation result is 50 Hz or higher. When a judgement result in the step S48 is YES, a step S49 supplies a modify request to the L1 scheduler 34 to request modifying of the S-RS transmission period to 5 subframes, and the process advances to the step S47. The process advances to the step S47 when the judgement result in the step S48 is NO. The step S47 sets the estimation flag FLG_B to "TRUE", and the step S44 averages the phase rotation A and the phase rotation B to update the value to a new phase rotation A (that is, updated value). This new phase rotation A (updated value) is supplied to the PUCCH frequency deviation corrector 31 and the PUSCH frequency deviation corrector 32.

The PUSCH frequency deviation corrector 32 supplied with the phase rotation A (updated value) performs the frequency deviation correction in a step S50 illustrated in FIG. 15, and the PUCCH frequency deviation corrector 31 supplied with the phase rotation A (updated value) performs the frequency deviation correction in a step S51 illustrated in FIG. 15. The L1 scheduler 34 that receives the modify request to request modifying of the S-RS transmission period from the frequency deviation range determinator 30, supplies the modify request to the RRC unit 37.

Figure 16:
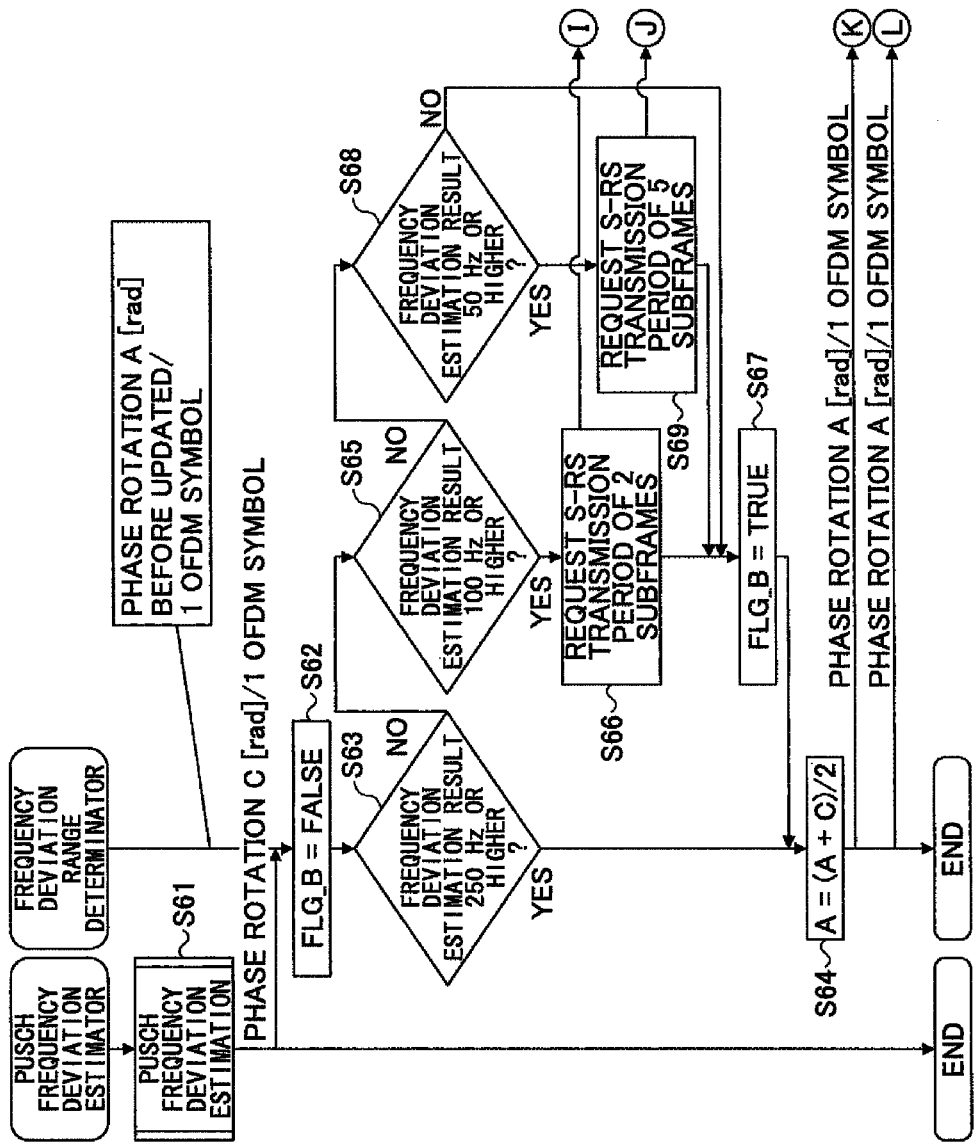
FIG. 16 is a flow chart for explaining a PUSCH reception process in the extended CP in an embodiment.

FIGS. 16 and 17 are flow charts for explaining a PUSCH reception process in the extended CP in an embodiment. In a step S61 illustrated in FIG. 16, the PUSCH frequency deviation estimator 27 estimates the frequency deviation from the phase difference of the D-RSs of the PUSCH in the extended CP, and supplies a phase rotation C obtained during the frequency deviation estimation to the frequency deviation range determinator 30.

The frequency deviation range determinator 30 retains a phase rotation A before the updating. In a step S62, the frequency deviation range determinator 30 sets an estimation flag FLG_B to "FALSE", and in a step S63, judges whether the frequency deviation estimation result (according to the value of the phase rotation C) is 250 Hz or higher. When a judgement result in the step S63 is YES, a step S64 averages the phase rotation A and the phase rotation C to update the value to a new phase rotation A (that is, updated value). This new phase rotation A (updated value) is supplied to the PUCCH frequency deviation corrector 31 and the PUSCH frequency deviation corrector 32.

When the judgement result in the step S63 is NO, a step S65 judges whether the frequency deviation estimation result is 100 Hz or higher. When a judgement result in the step S65 is YES, a step S66 supplies a modify request to the L1 scheduler 34 to request modifying of the S-RS transmission period to 2 subframes. Initially, the S-RS transmission period is 1 subframe. A step S67 sets the estimation flag FLG_B to "TRUE", and a step S64 averages the phase rotation A and the phase rotation C to update the value to a new phase rotation A (that is, updated value). This new phase rotation A (updated value) is supplied to the PUCCH frequency deviation corrector 31 and the PUSCH frequency deviation corrector 32.

On the other hand, when the judgement result in the step S65 is NO, in a step S68 the frequency deviation range determinator 30 judges whether the frequency deviation estimation result is 50 Hz or higher. When a judgement result in the step S68 is YES, a step S69 supplies a modify request to the L1 scheduler 34 to request modifying of the S-RS transmission period to 5 subframes, and the process advances to the step S67. The process advances to the step S67 when the judgement result in the step S68 is NO. The step S67 sets the estimation flag FLG_B to "TRUE", and the step S64 averages the phase rotation A and the phase rotation C to update the value to a new phase rotation A (that is, updated value). This new phase rotation A (updated value) is supplied to the PUCCH frequency deviation corrector 31 and the PUSCH frequency deviation corrector 32.

The PUSCH frequency deviation corrector 32 supplied with the phase rotation A (updated value) performs the frequency deviation correction in a step S70 illustrated in FIG. 17, and the PUCCH frequency deviation corrector 31 supplied with the phase rotation A (updated value) performs the frequency deviation correction in a step S71 illustrated in FIG. 17. The L1 scheduler 34 that receives the modify request to request modifying of the S-RS transmission period from the frequency deviation range determinator 30, supplies the modify request to the RRC unit 37.

The S-RS reception process in the extended CP is the same as the S-RS reception process in the normal CP illustrated in FIG. 13.

In the embodiment described above, the frequency deviation estimation result using the D-RS of the PUSCH and the frequency deviation estimation result using the S-RS of the PUSCH may be combined, according to the frequency deviation estimation result using the D-RS of the PUCCH Format 2, in order to modify the S-RS allocation period depending on the frequency deviation estimation result. Hence, the frequency deviation estimating range using the D-RS of the PUCCH Format 2 may be maintained, and the accuracy of the frequency deviation estimation may further be improved with respect to the mobile terminal (UE) having a relatively small frequency deviation.

In the steps S4 and S44 described above, the averaging process is not limited to A=(A+B)/2. For example, the averaging process may be represented by A=[A×µ+B(1−µ)]/2, where 0<µ<1. Similarly, in the steps S23, S33, and S64 described above, the averaging process is also not limited to A=(A+B)/2.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A base station apparatus for a wireless communication system in which a control data transmission channel and a user data transmission channel are allocated to different frequency bands, the base station apparatus comprising:
a first estimator configured to estimate a frequency deviation using a first reference signal for demodulation, included at predetermined time intervals, in the control data transmission channel that is received;
a second estimator configured to estimate a frequency deviation using a second reference signal for demodulation, included at time intervals longer than those of the first reference signal, in the user data transmission channel that is received;
a third estimator configured to estimate a frequency deviation using a third reference signal for estimating channel quality, included at time intervals longer than those of each of the first and second reference signals, in the user data transmission channel that is received; and
a determinator configured to obtain a frequency deviation estimation result by
obtaining the frequency deviation estimation result from a first value of the frequency deviation estimated by the first estimator when the first value is a first threshold value or greater,
obtaining the frequency deviation estimation result from a combination of the first value of the frequency deviation estimated by the first estimator and a second value of the frequency deviation estimated by the second estimator when the first value is less than the first threshold value and greater than or equal to a second threshold value that is smaller than the first threshold value, and
obtaining the frequency deviation estimation result from a combination of the first value of the frequency deviation estimated by the first estimator and a third value of the frequency deviation estimated by the third estimator when the first value is less than the second threshold value.

2. The base station apparatus as claimed in claim 1, further comprising:
a request unit configured to request extension of the time intervals at which the third reference signal is included in the user data transmission channel when the first value is less than the second threshold value and is greater than or equal to a third threshold value that is smaller than the second threshold value.

3. The base station apparatus as claimed in claim 2, wherein the request unit requests a further extension of the time intervals at which the third reference signal is included in the user data transmission channel when the first value is less than the third threshold value.

4. The base station apparatus as claimed in claim 3, further comprising:
a first corrector configured to correct the frequency deviation of the control data transmission channel according to the frequency deviation estimation result obtained by the determinator; and
a second corrector configured to correct the frequency deviation of the user data transmission channel according to the frequency deviation estimation result obtained by the determinator.

5. A frequency deviation estimating method for a wireless communication system in which a control data transmission channel and a user data transmission channel are allocated to different frequency bands, the frequency deviation estimating method comprising:
first estimating a frequency deviation using a first reference signal for demodulation, included at predetermined time intervals, in the control data transmission channel that is received;
second estimating a frequency deviation using a second reference signal for demodulation, included at time intervals longer than those of the first reference signal, in the user data transmission channel that is received;
third estimating a frequency deviation using a third reference signal for estimating channel quality, included at time intervals longer than those of each of the first and second reference signals, in the user data transmission channel that is received; and obtaining a frequency deviation estimation result by obtaining the frequency deviation estimation result from a first value of the frequency deviation estimated by the first estimating when the first value is a first threshold value or greater;

obtaining the frequency deviation estimation result from a combination of the first value of the frequency deviation estimated by the first estimating and a second value of the frequency deviation estimated by the second estimating when the first value is less than the first threshold value and greater than or equal to a second threshold value that is smaller than the first threshold value; and obtaining the frequency deviation estimation result from a combination of the first value of the frequency deviation estimated by the first estimating and a third value of the frequency deviation estimated by the third estimating when the first value is less than the second threshold value.

6. The frequency deviation estimating method as claimed in claim 5, further comprising:

requesting extension of the time intervals at which the third reference signal is included in the user data transmission channel when the first value is less than the second threshold value and is greater than or equal to a third threshold value that is smaller than the second threshold value.

7. The frequency deviation estimating method as claimed in claim 6, wherein the requesting requests a further extension of the time intervals at which the third reference signal is included in the user data transmission channel when the first value is less than the third threshold value.

8. A base station apparatus for a wireless communication system in which a control data transmission channel and a user data transmission channel are allocated to different frequency bands, the base station apparatus comprising:

a first estimator configured to estimate a frequency deviation using a first reference signal for demodulation, included at predetermined time intervals, in the control data transmission channel that is received;

a second estimator configured to estimate a frequency deviation using a second reference signal for demodulation, included at the predetermined time intervals, in the user data transmission channel that is received;

a third estimator configured to estimate a frequency deviation using a third reference signal for estimating channel quality, included at time intervals longer than those of the second reference signal, in the user data transmission channel that is received; and a determinator configured to obtain a frequency deviation estimation result by obtaining the frequency deviation estimation result from one of a first value of the frequency deviation estimated by the first estimator and a second value of the frequency deviation estimated by the second estimator when the one of the first value and the second value is a first threshold value or greater, and obtaining the frequency deviation estimation result from a combination of the one of the first value of the frequency deviation estimated by the first estimator and a second value of the frequency deviation estimated by the second estimator and a third value of the frequency deviation estimated by the third estimator when the one of the first value and the second value is less than the first threshold value.

9. The base station apparatus as claimed in claim 8, further comprising:

a request unit configured to request extension of the time intervals at which the third reference signal is included in the user data transmission channel when the one of the first value and the second value is less than the first threshold value and is greater than or equal to a second threshold value that is smaller than the first threshold value.

10. The base station apparatus as claimed in claim 9, wherein the request unit requests a further extension of the time intervals at which the third reference signal is included in the user data transmission channel when the one of the first value and the second value is less than the second threshold value.

11. The base station apparatus as claimed in claim 10, further comprising:

a first corrector configured to correct the frequency deviation of the control data transmission channel according to the frequency deviation estimation result obtained by the determinator; and a second corrector configured to correct the frequency deviation of the user data transmission channel according to the frequency deviation estimation result obtained by the determinator.

12. A frequency deviation estimating method for a wireless communication system in which a control data transmission channel and a user data transmission channel are allocated to different frequency bands, the frequency deviation estimating method comprising:

first estimating a frequency deviation using a first reference signal for demodulation, included at predetermined time intervals, in the control data transmission channel that is received;

second estimating a frequency deviation using a second reference signal for demodulation, included at the predetermined time intervals, in the user data transmission channel that is received;

third estimating a frequency deviation using a third reference signal for estimating channel quality, included at time intervals longer than those of the second reference signal, in the user data transmission channel that is received; and obtaining a frequency deviation estimation result by obtaining the frequency deviation estimation result from one of a first value of the frequency deviation estimated by the first estimating and a second value of the frequency deviation estimated by the second estimating when the one of the first value and the second value is a first threshold value or greater, and obtaining the frequency deviation estimation result from a combination of the one of the first value of the frequency deviation estimated by the first estimating and a second value of the frequency deviation estimated by the second estimating and a third value of the frequency deviation estimated by the third estimating when the one of the first value and the second value is less than the first threshold value.

13. The frequency deviation estimating method as claimed in claim 12, further comprising:

requesting extension of the time intervals at which the third reference signal is included in the user data transmission channel when the one of the first value and the second value is less than the first threshold value and is greater than or equal to a second threshold value that is smaller than the first threshold value.

14. The frequency deviation estimating method as claimed in claim 13, wherein the requesting requests a further extension of the time intervals at which the third reference signal is included in the user data transmission channel when the one of the first value and the second value is less than the second threshold value.

* * * * *